(12) United States Patent
Sonoda et al.

(10) Patent No.: US 6,773,784 B2
(45) Date of Patent: Aug. 10, 2004

(54) MAGNETIC DISK HAVING ULTRATHIN CARBON PROTECTIVE FILM AND MAGNETIC DISK APPARATUS

(75) Inventors: Kouji Sonoda, Ome (JP); Hiroshi Tani, Ninomiya (JP); Hiroyuki Matsumoto, Chigasaki (JP); Mitsuhiro Shoda, Odawara (JP); Toshinori Ono, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/364,501

(22) Filed: Feb. 12, 2003

(65) Prior Publication Data

US 2003/0224212 A1 Dec. 4, 2003

(30) Foreign Application Priority Data

Apr. 8, 2002 (JP) ........................................ 2002-104656

(51) Int. Cl.$^7$ ............................. G11B 5/725; G11B 5/82
(52) U.S. Cl. ...................... 428/65.4; 428/65.5; 428/212; 428/336; 428/694 TC; 428/694 TF

(58) Field of Search ................................. 428/212, 336, 428/65.4, 65.5, 694 TC, 694 TF

(56) References Cited

FOREIGN PATENT DOCUMENTS

| JP | 06-195694 A | * | 7/1994 |
| JP | 09-128732 A | * | 5/1997 |

* cited by examiner

Primary Examiner—Stevan A. Resan
(74) Attorney, Agent, or Firm—Antonelli, Terry, Stout & Kraus, LLP

(57) ABSTRACT

The object of this invention is to provide a magnetic disk which has an excellent durability even with a protective film having a small film thickness of 4 nm or less. The magnetic disk of this invention is a magnetic disk comprising a non-magnetic substrate and, provided thereon, a magnetic metal film, carbon protective film and fluorine-containing lubricant film, wherein the carbon protective film is a DLC film having a film thickness of 4 nm or less and the ratio of infrared absorption intensity resulting from the C—H bond near 2,920 cm$^{-1}$ determined by FT-IR using ATR to infrared absorption intensity resulting from the C—F bond of the lubricant film is 0.035–0.060.

5 Claims, 4 Drawing Sheets

MAGNETIC DISK HAVING ULTRATHIN CARBON PROTECTIVE FILM AND MAGNETIC DISK APPARATUS

FIELD OF THE INVENTION

This invention relates, in a magnetic disk having ultrathin carbon protective film 4 nm or less in thickness, to a relation between the protective film property and the lubricant film thickness which can markedly improve the wear resistance of the magnetic disk. Further, it relates, in a magnetic disk apparatus having a mechanism for feeding a lubricant into the apparatus, to a relation between the film property of the protective film of the magnetic disk, the lubricant supplied from the apparatus, and the lubricant film thickness which can impart a high reliability to the magnetic disk apparatus.

BACKGROUND OF THE INVENTION

With recent trend toward higher recording density in magnetic disk apparatuses, the use of thinner protective film is growing in order to narrow the distance between the magnetic head and the magnetic film of the magnetic disk. For protective film of magnetic disks, there has hitherto been used amorphous carbon film or diamond-like carbon (DLC) film. With the tendency of recent years toward the use of thinner film, however, with the object of forming a DLC film more excellent in strength, such processes have been proposed as the chemical vapor deposition (CVD) method, ion beam deposition (IBD) method and filtered cathodic arc method.

In DLC film, there exist in the film carbon bonds of $SP^2$ and $SP^3$ structures and bonds of carbon with hydrogen. In particular, the physical property of DLC film varies greatly according to the amount of hydrogen in the film. It is known that, in general, the film hardness becomes maximum at a certain hydrogen amount and the hardness decreases when a more amount of hydrogen is incorporated thereinto because then hydrocarbon structures increase gradually. Accordingly, the optimization of hydrogen amount in DLC film is an important problem in controlling the film property. To deal with the problem, JP-A-6-195694 specifies the atomic ratio of carbon to hydrogen to be not less than 60/40 and not more than 90/10.

Further, JP-A-9-128732 discusses a correlation of film property with hydrogen amount by using the fluorescence intensity ratio of Raman spectrum and specifies the hydrogen amount at 10–37 at %. In these prior examples, since the thickness of protective film is very large, namely not less than 10 nm, the film property evaluation of protective film could be conducted in a simple and easy manner by using FT-IR (Fourier Transform Infrared Spectrometry), Raman spectrometry, etc.

SUMMARY OF THE INVENTION

In the prior techniques, however, the film property evaluation of ultrathin, as 5 nm or less, DLC protective film is difficult to attain, since the film thickness is too small, by such methods of determination as FT-IR or Raman described above because the detection signal becomes too weak. The present inventors have found that even when determination is made with a protective film of increased thickness to cope with the difficulty, an accurate evaluation of film property cannot be attained because the property of the film of increased thickness is not the same as that of a protective film of a thickness used in practice owing to difference in film-forming temperature and film-forming rate. Accordingly, it is intended by the present inventors to establish a proper evaluation method which can determine the film property of ultrathin DLC protective film and to provide a magnetic disk on the basis of the evaluation method.

Up to now, on the protective film of a magnetic disk is coated a fluorine-containing lubricant. The lubricant generally used is one called perfluoropolyether, and the film thickness is about 1–3 nm. However, nothing has hitherto been reported on a relation between protective film and lubricant film, particularly on a relation between the film property of thin protective film and the film thickness of lubricating film. In view of such situations, the present inventors have found an optimum range regarding the relations of these film thicknesses.

The prior technology for feeding a lubricant as a gas into a magnetic disk apparatus comprises providing a lubricant reservoir in the head disk assembly. The object of supplying a lubricant is to decrease the spinning off of lubricant due to rotation and heat.

However, in the prior art, no due consideration has been given to the material and adsorption characteristic of a lubricant to be supplied, the material and adsorption characteristic of lubricant film formed on the magnetic disk, and the combination thereof, the combination of the film property of protective film with the material of lubricant to be supplied, and the combination with the film thickness of lubricant film after having been supplied. The present inventors have found that in the prior art methods, even when a lubricant is fed to a magnetic disk or head disk interface, the reliability cannot always be improved.

In the prior art method, further, fouling of the magnetic head cannot always be prevented depending on the lubricant used in supplying, which leads to lowering of reliability. The present inventors have further found that, since no adequate investigation has been made on the congeniality between the film property of thin protective film of a magnetic disk and the lubricant fed from the apparatus, the reliability of a magnetic disk apparatus cannot always be improved depending on the combination thereof.

Particularly, since DLC film generally shows a low adsorption energy of lubricant film unlike amorphous carbon film, due consideration must be given to the relation of lubricant film with protective film. Thus, a lubricant film on DLC film, which has a low adsorption energy, in some cases decreases greatly in its amount during the operation of the apparatus owing to spin-off (scattering of lubricant due to rotation of the magnetic disk) and pick-up by the magnetic head (a phenomenon wherein the lubricant is scratched off by the magnetic head and decreases its amount when the magnetic head and the magnetic disk contact with each other). In such cases, it is important to determine the optimum combination of the lubricant film thickness of the magnetic disk with the film property of protective film.

Presently, the thickness of protective film of magnetic disks is not more than 4–5 nm. In such an ultrathin film, it has become more difficult to secure wear resistance reliability for contact of a magnetic head with a magnetic disk, and it has become difficult to obtain a satisfactory result by optimizing the film property on the basis of hydrogen amount determined by the method of evaluation for DLC protective film as used in prior art techniques. Further, though the previous trend was to pursue high hardness films, in the case of ultrathin film, brittleness to deformation caused by underlayer material, etc., or elasticity to high speed, high friction force contact of a magnetic head with a magnetic disk becomes a problem. As a result, film is required which has both an appropriate hardness and an appropriate elasticity. On the other hand, with the trend toward the use of thin protective film, the contribution of lubricant film pertaining to wear resistance has increased, and importance has been attached to the optimization design of lubricant film suited to protective film.

In view of the above-mentioned problems, the object of this invention is to provide a magnetic disk which is excellent in durability even when the thickness of protective film is small, 4 nm or less, in more particular, to provide, for the purpose of improving the reliability of a magnetic disk apparatus, to provide the optimum combination of the film property of ultrathin protective film 4 nm or less in thickness, the material of lubricant film, and the thickness of lubricant film.

To solve the above-mentioned problems, according to this invention, there is provided a magnetic disk comprising a non-magnetic substrate and, provided thereon, at least a magnetic metal film, a carbon protective film and a fluorine-containing lubricant film, wherein the carbon protective film is a DLC film 4 nm or less in thickness, and the ratio of absorption intensity resulting from the C—H bond near 2,920 cm$^{-1}$ determined by FT-IR using ATR to absorption intensity resulting from the C—F bond of the lubricating film is 0.035–0.060.

As a result, a magnetic disk can be provided which has adequate hardness and elasticity, is covered with an adequate amount of lubricant film and is excellent in wear resistance reliability.

It is generally considered that the carbon protective film assumes an amorphous structure wherein SP$^3$ bonds of diamond structure and SP$^2$ bonds of graphite structure are present in admixture. By means of FT-IR measurement, the amount of hydrogen in the carbon protective film can be evaluated from the absorption spectra of lattice vibrations of the above-mentioned SP$^2$- and SP$^3$-bonded CH$_2$, CH$_3$, etc. However, since the carbon protective film of the magnetic disk aimed at in this invention is an ultrathin film 4 nm or less in thickness, a usual FT-IR reflection spectrum is insufficient in sensitivity. The present inventors have found that by using the ATR (Attenuated Total Reflectance) method, the surface sensitivity of FT-IR is improved and the evaluation of film property of carbon protective film becomes possible even for the above-mentioned ultrathin film.

The "ATR method" refers to a method which comprises contacting a sample to a prism having a high refractive index, entering infrared light thereinto, and observing a phenomenon wherein the evanescent wave developed at the interface between the prism and the sample at the time of infrared light incidence is absorbed to the sample, resultantly to cause change in the amount of light which passes through the prism.

The present inventors have further found that the ratio of absorption intensity resulting from the CH$_2$ bond near 2920 cm$^{-1}$ to absorption intensity resulting from the CF bond of lubricant film is correlated with wear resistance and assumes a maximum value in a specific region (not less than 0.35 and not more than 0.060). It is considered that when the intensity is not more than 0.035, wear resistance deteriorates because the amount of hydrogen in carbon protective film is small and hence elasticity is low. On the other hand, when the intensity ratio is not less than 0.060, wear resistance lowers steeply. This is presumably because the amount of hydrogen in carbon protective film is too large, hence the density of protective film decreases and its hardness lowers. However, since the above-mentioned intensity ratio has been normalized by the absorption intensity of the CF bond of lubricant film, when the lubricant film thickness changes the optimum amount of hydrogen in protective film also changes. This invention gives a guide to wear resistance design not only of protective film but including lubricant film.

The above-mentioned magnetic disk can secure a sufficient durability even when the thickness of carbon protective film is not more than 4 nm. When the thickness of the carbon protective film is more than 4 nm, spacing loss develops in recording and regeneration at the magnetic head, which is unfavorable for a high density recording medium.

In another means of this invention, there is provided a magnetic disk apparatus which comprises a magnetic disk built-in within the apparatus and comprising a non-magnetic substrate and, provided thereon, at least a magnetic metal film and carbon protective film, wherein the carbon protective film is a diamond-like carbon (DLC) film having a film thickness of 4 nm or less, and a mechanism for supplying into the apparatus a lubricant represented by the chemical formula (1) as a gas, wherein, after preparation of the magnetic disk apparatus, the magnetic disk built-in within the apparatus is measured by FT-IR using ATR and the film property of the protective film is controlled such that the ratio of infrared absorption intensity resulting from the C—H bond near 2920 cm$^{-1}$ to infrared absorption intensity resulting from the C—F bond of lubricant film may be 0.035–0.060.

$$HOCH_2CF_2(OC_2F_2)_p(OCF_2)_qOCF_2CH_2OH \qquad (1)$$

wherein p is 0 or an integer of 1 or more, q is 0 or an integer of 1 or more, and the average molecular weight of the lubricant is 600–2400.

In the case of a magnetic disk apparatus having a mechanism for supplying a lubricant of formula (1) into the apparatus, after preparation of the apparatus, that is, after completion of assembling and inspection of the apparatus, the lubricant gas supplied into the apparatus has been adsorbed to the magnetic disk, and the lubricant film has a thickness of about 1.5 nm–2.5 nm. At this time the film property of the protective film is controlled such that the ratio of infrared absorption intensity resulting from the C—H bond near 2920 cm$^{-1}$ to infrared absorption intensity resulting from the C—F bond of lubricant film obtained by the above-mentioned measurement may be 0.035–0.060, whereby a magnetic disk apparatus with a high reliability can be provided.

Other objects, features and advantages of the invention will become apparent from the following description of the embodiments of the invention taken in conjunction with the accompanying drawings.

DESCRIPTION OF THE PREFERRED EMBODIMENT

This invention is described in detail below with reference to Drawings.

Figure 1:
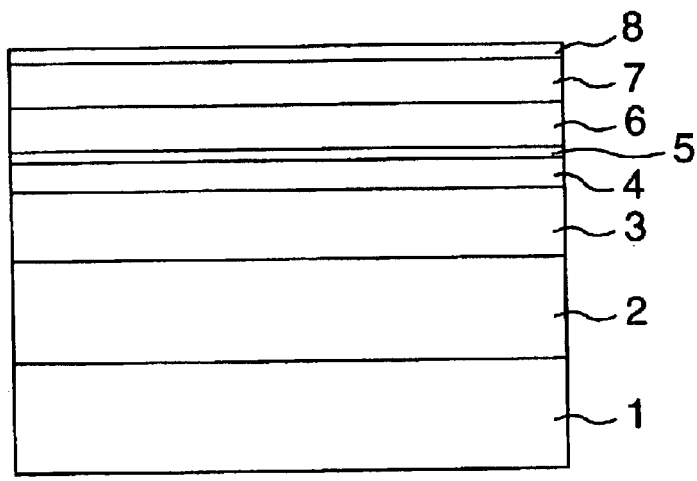
FIG. 1 is a sectional view of a magnetic disk according to one Example of this invention.

A glass substrate having an outside diameter of 3.0 inches and a thickness of 1.27 mm was used as the non-magnetic substrate. The glass substrate has a surface roughness, in terms of center line average roughness R, of about 0.6 nm. The sectional view of the magnetic disk prepared is shown in FIG. 1.

Numeral 1 indicates a glass substrate, 2 NiTa alloy seed film, 3 CrTi-type alloy underlayer film, 4 CoCr-type alloy lower layer magnetic film, 5 Ru intermediate film, 6 CoCr-type alloy upper layer magnetic film, 7 DLC protective film, and 8 perfluoropolyether lubricant film represented by the formula (1). The average molecular weight of the lubricant is about 4,000. The method for preparation of the magnetic disk is described below.

Figure 7:
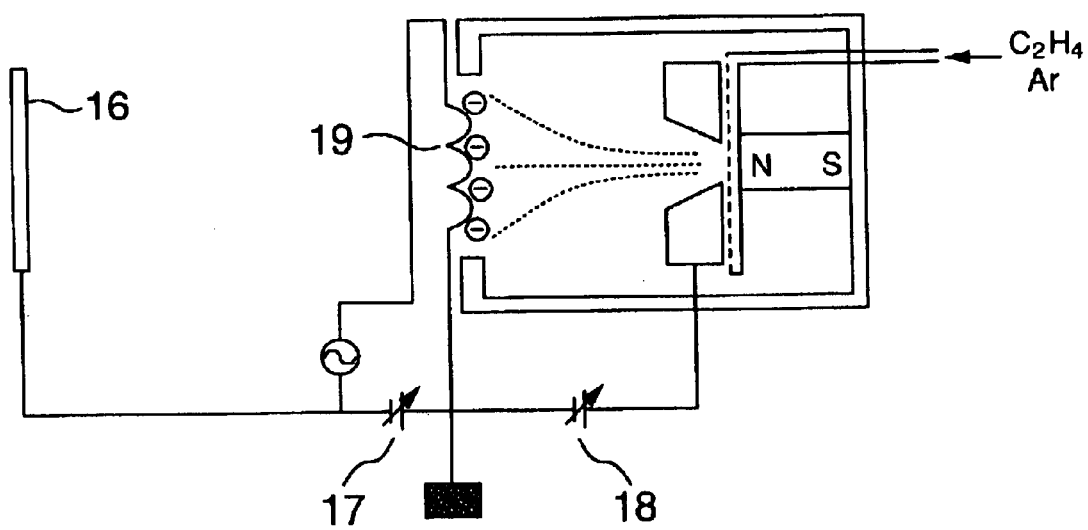
FIG. 7 is a schematic structural view of an IBD film-forming apparatus used for forming the protective film of a magnetic disk of this invention.

The glass substrate 1 was washed, dried and then 30 nm of NiTa seed film 2 was formed thereon. Thereafter, the glass substrate 1 having the seed film 2 formed thereon was heated with a lamp heater to about 280° C., and then 10 nm of CrTi-type alloy underlayer film 3 was formed. Further, CoCr-type alloy lower layer magnetic film 4 of 4 nm thickness was formed, and successively 0.5 nm of Ru intermediate layer 5 and 17.5 nm of CoCr-type alloy upper layer magnetic film 6 were formed. DLC protective film 7 thereon was formed by the IBD method in a film thickness of 4 nm and 5 nm. The film-forming apparatus was made by Intevac Corp. The thickness of protective film was determined by the X-ray reflection method. To enhance the accuracy of film thickness determination, 5 nm of Cr film was formed on the protective film for quantification. The quantification of film thickness by the X-ray reflection method was conducted by using $CuK_{\alpha 1}$ X-ray on SLX2000 (a trade name, mfd. by Rigaku Denki Kogyo K.K.). The schematic view of the IBD film-forming apparatus is shown in FIG. 7.

The "IBD film-forming method" refers to a film-forming method which comprises generating ethylene plasma through the collision process of thermoelectrons produced by resistance heating of filament 19 and forming hydrogenated carbon film through the surface reaction of hydrocarbon radicals attended by ion injection (ion-assisted chemical vapor phase reaction).

The film-forming conditions in the IBD method were as follows: emission current of 0.3–0.5A, anode voltage 18 of 40–90V, bias voltage difference 17 of 0–110V, ethylene ($C_2H_4$) flow rate of 40–100 sccm (standard cubic centimeter per minute) and Argon gas flow rate of 0–40 sccm. Thereafter, the resultant film was taken out of the film-forming apparatus, and the lubricant of the formula (1) was coated on the carbon protective film to form lubricating film 8 2.0 nm–2.4 nm in thickness.

Each of the film samples thus obtained was subjected to FT-IR measurement using ATR, Raman measurement and sliding resistance evaluation. The FT-IR measurement using ATR was conducted by using IFS-120 HR (a trade name of FT-IR, mfd. by Bruker Optics Inc.) (incident angle: 60°, prism: Ge, polarized light: P). The Raman measurement was made by using T-640000 (mfd. by Jobin Yvon Corp.) and a light source of ART laser having a wave length of 514.5 nm. Wear resistance evaluation was conducted as follows. For wear resistance evaluation at minimum head flying height, the head was brought to a condition at which it always contacts with the magnetic disk by inversely rotating the motor, the region of the magnetic disk between radius 29 mm and radius 31 mm was seeked, and the time till crash was determined. The number of rotation was 10,000 rpm. Table 1 shows the film-forming conditions in forming protective films of Examples 1–3 and Comparative Examples 1–6, the results of FT-IR measurement using ATR and the results of sliding resistance evaluation.

TABLE 1

| | Emission current (A) | Anode voltage (V) | Bias voltage (V) | Ethylene flow rate (sccm) | Ar flow rate (sccm) | Protective film thickness (nm) | ATR $I_{CH_2}/I_{CF}$ | Sliding resistance time till crash (h) | |
|---|---|---|---|---|---|---|---|---|---|
| Example 1 | 0.5 | 90 | 0 | 60 | 0 | 4 | 0.058 | 22 | 25 |
| Example 2 | 0.5 | 40 | 50 | 60 | 17 | 4 | 0.043 | 18 | 21 |
| Example 3 | 0.5 | 90 | 110 | 100 | 40 | 4 | 0.035 | 13 | 16 |
| Comparative Example 1 | 0.5 | 90 | 110 | 60 | 17 | 4 | 0.028 | 3 | 1.5 |
| Comparative Example 2 | 0.3 | 90 | 110 | 60 | 0 | 4 | 0.021 | 2 | 2.4 |
| Comparative Example 3 | 0.3 | 90 | 0 | 100 | 17 | 4 | 0.062 | 4 | 1.9 |
| Comparative Example 4 | 0.5 | 90 | 0 | 60 | 0 | 5 | 0.062 | 23 | 22 |
| Comparative Example 5 | 0.5 | 40 | 50 | 60 | 17 | 5 | 0.046 | 23 | 24 |
| Comparative Example 6 | 0.5 | 90 | 110 | 60 | 17 | 5 | 0.026 | 23 | 22 |

Figure 2:
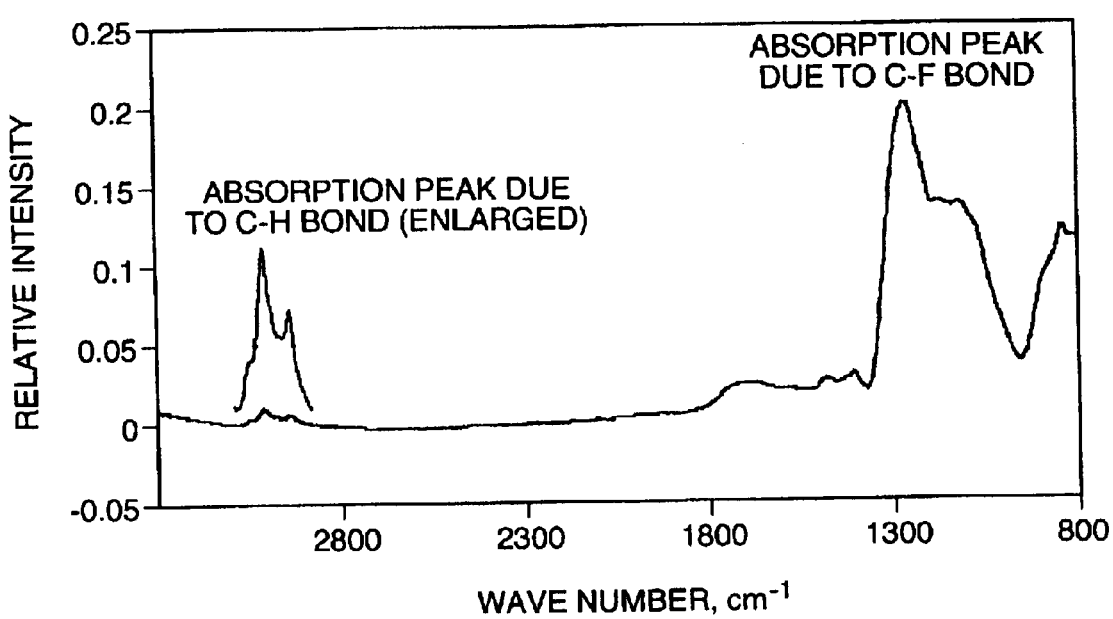
FIG. 2 is a graph showing an infrared absorption spectrum resulting from the C—H bond measured by FT-IR using ATR, of a magnetic disk according to one Example of this invention.
Figure 3:
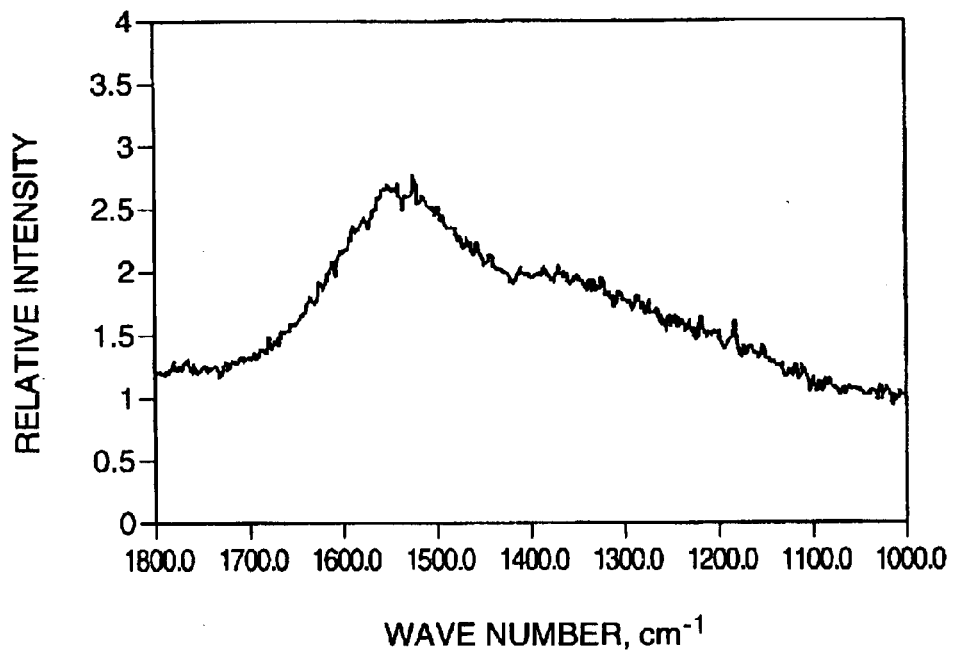
FIG. 3 is a graph showing a Raman spectrum of the protective film of a magnetic disk according to one Example of this invention.

FIG. 2 shows the infrared absorption spectrum resulting from the C—H bond measured by FT-IR using ATR, of the magnetic disk shown in Example 1, and FIG. 3 shows the Raman spectrum of the protective film. The Raman spectrum shown in FIG. 3 reveals that the protective film of the magnetic disk prepared in Example 1 is a DLC protective film. The Raman spectra of other Examples and Comparative Examples also assume similar peak shapes, revealing that the films are each a DLC film. FIG. 2 reveals that at least three absorption spectra resulting from C—H bonds are present in the region of 2,850–3,000 $cm^{-1}$.

When the magnetic disk of Example 1 was examined by conventional reflection FT-IR, no such speactra resulting from C—H bonds could be observed, which revealed that such observation could be attained only with the use of FT-IR measurement using ATR. In the spectrum, the ratio of the absorption peak at about 2920 $cm^{-1}$ to the absorption peak resulting from the C—F bond of lubricant is shown in Table 1. In this way, it has become possible to greatly improve the repetition accuracy of FT-IR measurement using ATR, which makes it possible to compare protective film properties.

The reason for herein adopting the ratio relative to the absorption peak resulting from C—F bonds is based on the viewpoints that, while ATR measurement is influenced by the condition of contact between the sample magnetic disk and the prism and hence is poor in reproducibility of absorption peak intensity, reproducibility can be improved by adopting the ratio relative to the C—F absorption peak which can be measured simultaneously with the absorption peak of C—H bonds and that a design which includes lubricant film too is necessary. Though the absorption peak at 2920 $cm^{-1}$ was used in the present Example, similar effects can also be obtained by using absorption peaks resulting from other C—H bonds according to similar procedure.

Figure 4:
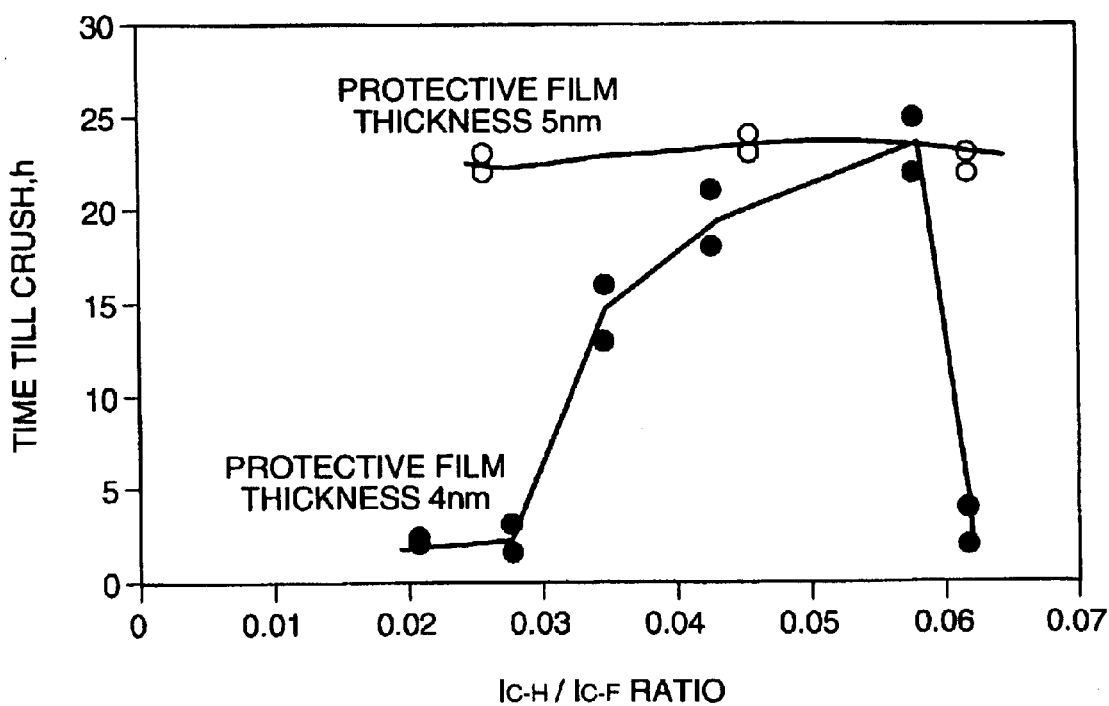
FIG. 4 is a graph showing a relation between the result of FT-IR measurement using ATR and the result of sliding resistance evaluation, of magnetic disks according to an Example and a Comparative Example of this invention.

FIG. 4 shows a relation between the result of FT-IR measurement using ATR and the result of wear resistance evaluation. As is apparent from FIG. 4, whereas no dependency on the $I_{C-H}/I_{C-F}$ ratio is observed in Comparative Examples 4, 5, and 6 wherein the protective film is 5 nm in thickness, a marked improvement in wear resistance in the region wherein the $I_{C-H}/I_{C-F}$ ratio is 0.035–0.060 in Examples and Comparative Examples wherein the protective film is 4 nm in thickness. Accordingly, this invention exhibits its beneficial effect in magnetic disks having ultrathin protective film 4 nm or less in thickness. The sliding resistance of the magnetic disk of this invention is equal to that of magnetic disks having protective film 5 nm in thickness. Thus, this invention can provide a magnetic disk which has a wear reliability of practically sufficient level and is suitable for high density recording.

Figure 5:
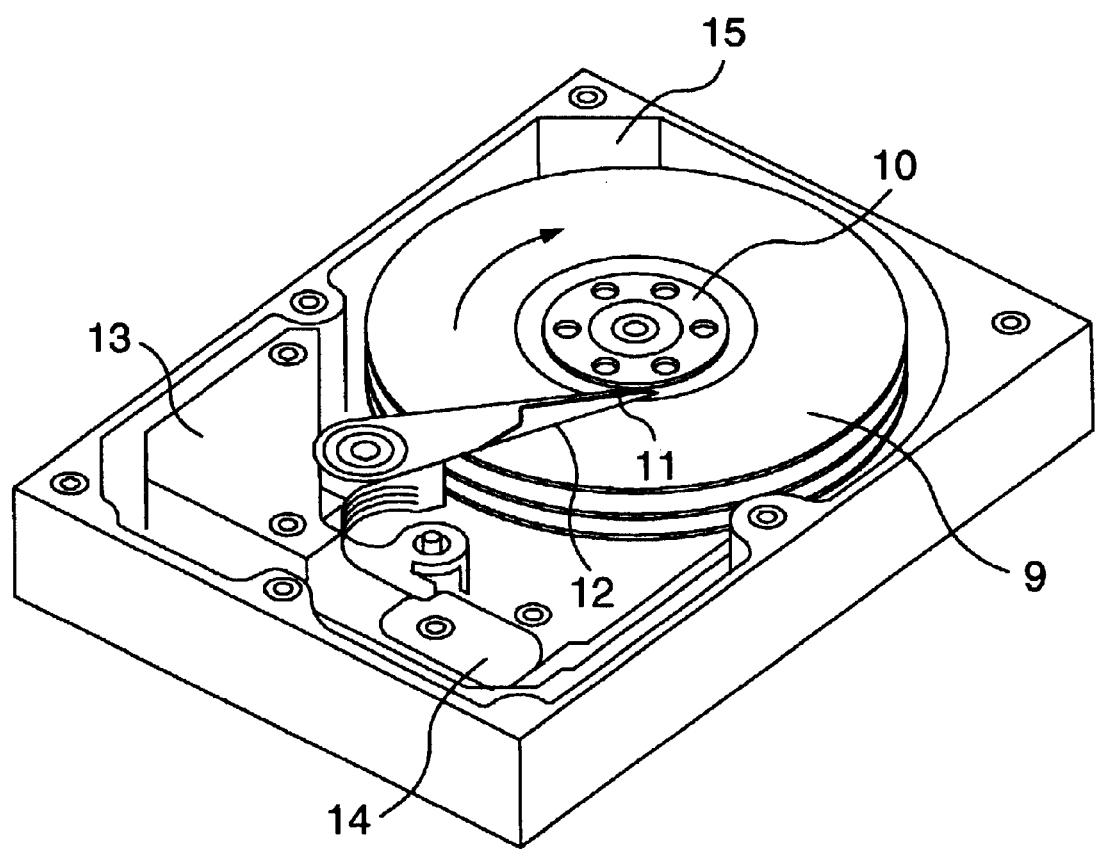
FIG. 5 is a schematic structural view of a magnetic disk apparatus according to this invention.

FIG. 5 shows a schematic view of a magnetic disk apparatus carrying a magnetic disk according to the above-mentioned Example. The apparatus is constructed of spindle 10 for rotating magnetic disk 9, arm 12 for holding magnetic head 11 and voice coil motor 13 for positioning it, circuit 14 for processing signals, a mechanism (in this case, dust filter 15) for supplying a lubricant into the apparatus, and others. A magnetic apparatus at the predetermined position of which had been placed dust filter 15 to which 1.0 mg of a lubricant represented by the formula (1) and having a number average molecular weight of 2,000 had been added by drops was prepared, and one of the magnetic disks of Examples 1–3 and Comparative Examples 1–6 was built therein. In the magnetic disks of Examples 1–3 and Comparative Examples 1–6 used, for clearly evaluating the relation of protective film property with lubricant film thickness, the lubricant film was rinsed with a lubricant solvent (HFE 7200, a trade name, mfd. by Sumitomo 3M Ltd.) to decrease the lubricant film thickness to about 0.5–0.6 nm. The number of rotation of the magnetic disk apparatus is 10,000 rpm, recording density is about 20 $Gbit/inch^2$, head flying height is about 15 nm, and the test environment temperature is 50° C. The test conducted was a following test wherein recording and reading were repeated with the magnetic head at a position of 38 mm radius of the magnetic disk, and the time till the development of read error was compared. Since read error is more liable to develop when abraded powder and lubricant adhere to the head, it is important to optimize the protective film property, lubricant film thickness, etc. so as to prevent the development of head fouling. Each of the magnetic disk apparatuses were subjected to 500 hours of test, then disassembled, and the magnetic disk which had been mounted on the magnetic disk apparatus was examined for the relation between its lubricant film thickness and protective film property by means of FT-IR using ATR. As a result, a relation shown in FIG. 6 was revealed between the $I_{C-H}/I_{C-F}$ ratio and error develop time.

Figure 6:
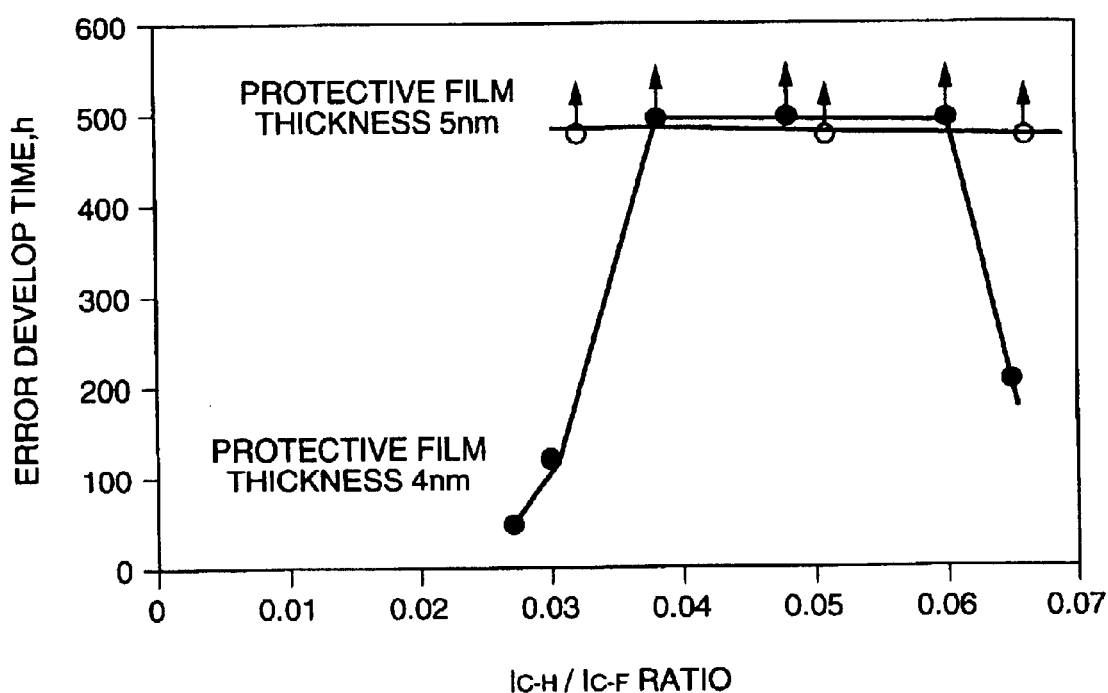
FIG. 6 is a graph showing a relation between the result of FT-IR measurement using ATR and the error develop time, of magnetic disks according to an Example and a Comparative Example of this invention.

The lubricant film thickness of the magnetic disk after the test was found to have had increased to 1.5–2.1 nm in contrast to 0.5–0.6 nm of the film before being built in. This is because the lubricant was supplied as a gas from the lubricant reserver placed in the apparatus and adhered to the magnetic disk surface. Consequently, the lubricant film thickness becomes larger than that before the test. In such a magnetic disk apparatus wherein the lubricant film thickness of the disk increases as the result of the disk being built-in within the magnetic disk apparatus and operated, it is important, as shown in FIG. 6 with regard to the relation of the film property of protective film with the film thickness of lubricant, to determine the protective film property so as to attain an $I_{C-H}/I_{C-F}$ ratio of 0.035-0.06.

By determining the protective film property in the above-mentioned manner, it becomes possible to obtain a magnetic disk apparatus having an excellent reliability even with a magnetic disk provided with ultrathin protective film 4 nm or less in thickness. As a comparative example, a magnetic disk apparatus was also prepared in which the mechanism for supplying a lubricant was not present, in other words, the lubricant was not added dropwise to the dust filter, and subjected to a similar test. The magnetic disk built-in within the apparatus was the same as that used in Example 1 described above. As the result, error developed after about 300 hours. When, after 500 hours, the magnetic disk apparatus was disassembled and the lubricant film thickness of the magnetic disk was measured, it was found that the film thickness was about 0.3–0.4 nm, namely, it had decreased as compared with the lubricant film thickness before test.

According to this invention, a magnetic disk can be provided which has both a DLC protective film having an appropriate elasticity and hardness even with a protective film thickness of 4 nm or less and which has a high wear resistance reliability and is suited to high density recording. Further, a magnetic disk apparatus which has a high reliability and is suited to high density recording can be provided.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A magnetic disk comprising a non-magnetic substrate and, provided thereon, at least a magnetic metal film, carbon protective film and fluorine-containing lubricant film wherein the carbon protective film is a diamond-like carbon film having a film thickness of 4 nm or less, and the ratio of infrared absorption intensity resulting from the C—H bond near 2920 cm$^{-1}$ determined by measuring the upper part of the magnetic disk by FT-IR using ATR to infrared absorption intensity resulting from the C—F bond of the lubricating film is 0.035–0.060.

2. The magnetic disk according to claim 1 wherein the non-magnetic substrate is a glass substrate.

3. The magnetic disk according to claim 2 which has a NiTa alloy seed film and CrTi-type alloy underlayer film between the glass substrate and the magnetic metal film.

4. The magnetic disk according to claim 3 wherein the magnetic metal film has a CoCr-type alloy lower layer magnetic film, Ru intermediate layer and CoCr-type alloy upper layer magnetic film.

5. A magnetic disk apparatus which comprises (A) a magnetic disk comprising a non-magnetic substrate and, provided thereon, at least a magnetic metal film, a diamond-like carbon film having a film thickness of 4 nm or less, and a lubricant represented by the chemical formula (1), wherein the ratio of infrared absorption intensity resulting from the C—H bond near 2920 cm$^{-1}$ determined by FT-IR using ATR to infrared absorption intensity resulting from the C—F bond of lubricating film is 0.035–0.060, and (B) a mechanism for supplying the lubricant represented by the formula (1) as a gas, $$HOCH_2CF_2(OC_2F_2)_p(OCF_2)_qOCF_2CH_2OH \qquad (1)$$

wherein p is 0 or an integer of 1 or more, q is 0 or an integer of 1 or more, and the number average molecular weight of the lubricant is 600–2,400.

* * * * *